United States Patent [19]
Matthew

[11] Patent Number: 5,144,655
[45] Date of Patent: Sep. 1, 1992

[54] TELEPHONE HANDSET

[76] Inventor: Berry-Smith Matthew, Australia Post, Canberra City, A.C.T. 2601, Australia

[21] Appl. No.: 356,214

[22] Filed: May 24, 1989

[51] Int. Cl.$^5$ ............................................. H04M 1/00
[52] U.S. Cl. ...................................................... 379/433
[58] Field of Search ............... 379/433, 435, 436, 440, 379/428, 434; D14/151, 253, 142, 248

[56] References Cited

U.S. PATENT DOCUMENTS

| | | | |
|---|---|---|---|
| 2,949,509 | 8/1960 | Whidden | 379/436 |
| 3,515,816 | 6/1970 | Laing | 379/436 |
| 3,838,229 | 9/1974 | Morrell et al. | 379/436 |
| 4,713,836 | 12/1987 | Suzuki | 379/428 |
| 4,736,411 | 4/1988 | Chan | 379/428 |
| 4,782,528 | 11/1988 | Inoue et al. | 379/433 |

Primary Examiner—James L. Dwyer
Assistant Examiner—Jason Chan

[57] ABSTRACT

A two piece telephone having a handset removably located in a base. The base being suitably shaped to locate and cradle the handset and maintain contact with a hook switch. The handset being an elongated housing with a shorter mouthpiece section being angularly disposed towards the longer earpiece housing section. The base cradle having a corresponding though more acute angular form that forms a fulcrum that the handset can pivot about. When shorter light pressure is applied to the back of the shorter mouthpiece section of the handset housing the handset pivots about the base fulcrum and the longer earpiece section of the housing rises from the base cradle, thus facilitating the action of picking up the handset.

2 Claims, 3 Drawing Sheets

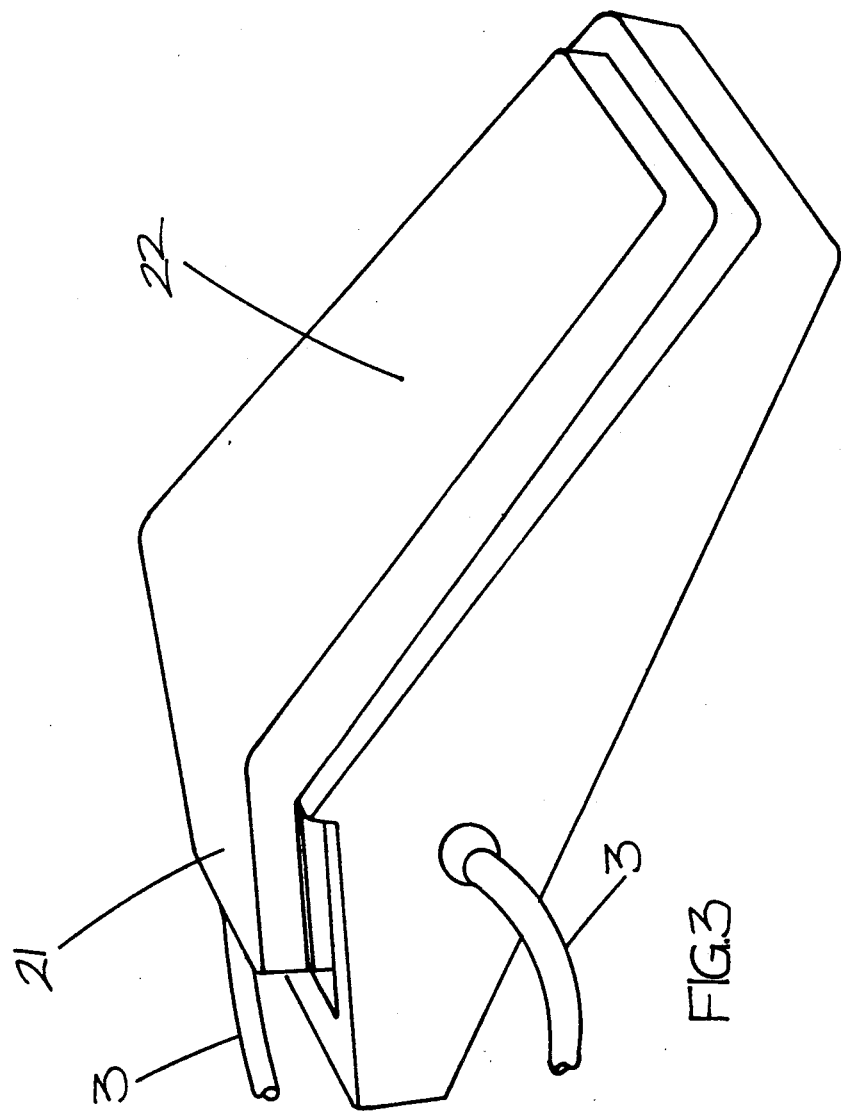

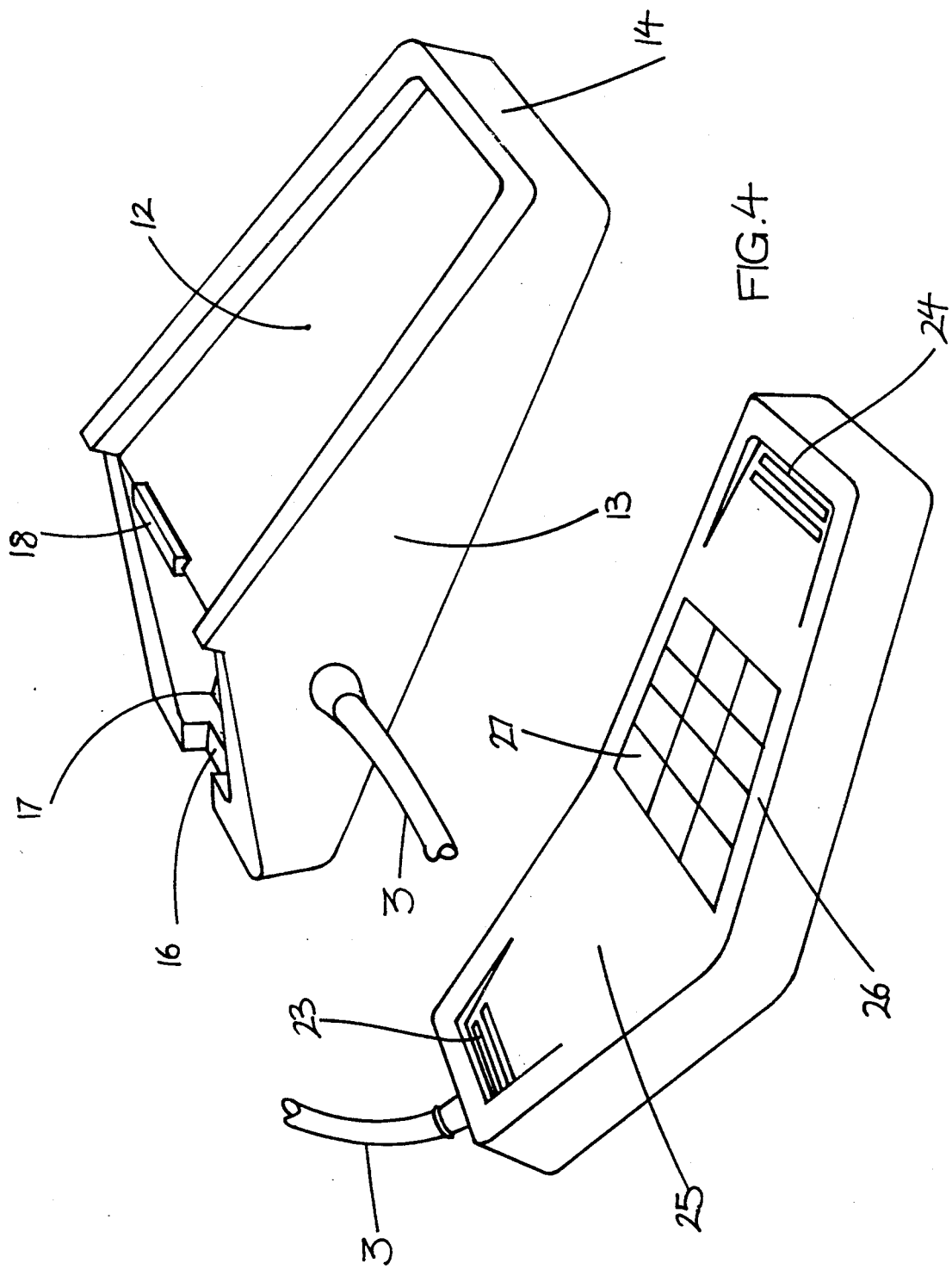

TELEPHONE HANDSET

BACKGROUND

The invention relates to a telephone handset having handpiece adapted to be removably supported by a base. There are a variety of known telephone handsets of that type. Generally, the handpiece is formed with an earpiece enclosing receiving means. The other items of equipment such as a mouthpiece with a microphone, dialling means, circuitry and switches and the like have been housed in either the handpiece or the base. Generally at least one switch operating member is engaged by the handpiece in its support position and released when the handpiece is removed.

Of particular concern is a telephone handset wherein an elongated handpiece has a mouthpiece towards one end thereof and an earpiece towards the other end thereof and is adapted to rest on the base to engage the switch operating member. With a handset of this kind, care is required to ensure that the handpiece is replaced in its proper position fully engaging the switch operating member so that the switch is correctly conditioned, and that the handpiece is not accidentally displaced from that position.

To this end, the base may be formed with a cradle for removably supporting the handpiece, the side walls of the cradle assisting the proper positioning of the handpiece and its retention in position. The deeper the handpiece nestles into the cradle, the greater is the protection from accidental displacement. However, particularly with a slim-line handpiece, gripping the handpiece to remove it from its cradle may be a problem. That problem is magnified in the case of disabled persons, people with manual difficulties, arthritis sufferers and the like.

Thus to alleviate these difficulties, a telephone handset may comprise an elongated handpiece having a mouthpiece towards one end thereof and an earpiece towards the other end thereof, a base formed with a cradle for removably supporting said handpiece, the handpiece adapted to rest in the cradle with one end thereof overlying a void in the base, the arrangement being such that depression of said one end of the handpiece into the void causes the handpiece to pivot about a line intermediate its length so that the other end of said handpiece rises to facilitate gripping of said handpiece for removal thereof.

DESCRIPTION OF DRAWINGS

The invention will now be described in relation to the accompanying drawings which illustrate one telephone handset embodying the features of the invention.

In the drawings

FIG. 3 is a perspective view of the telephone handset; and

FIG. 4 is a view of the handset with the base in its usual position and the handpiece removed from its resting position on the base.

DESCRIPTION OF PREFERRED EMBODIMENT

Figure 1:
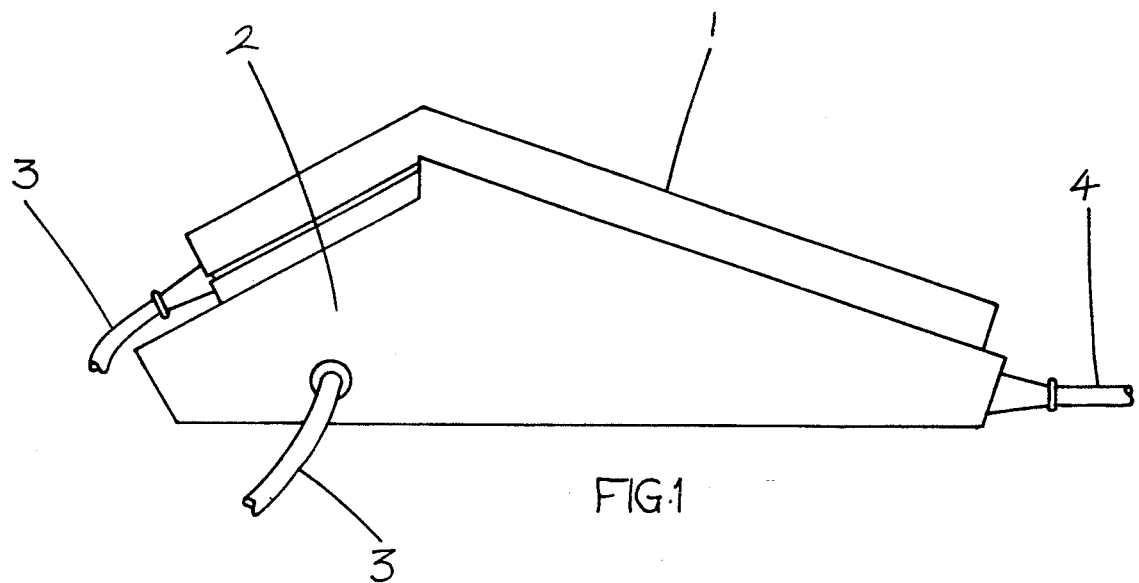
FIG. 1 is a side view of a telephone handset with the handpiece resting on the base.

In the embodiment illustrated, a telephone handset comprises a base 2 adapted to sit upon a substantially horizontal support (not shown), an elongated handpiece 1 resting on base 2, a cable 3 joining circuit components in handpiece 1 and base 2 and a connecting cable 4 from the base. In the "On Call" situation, handpiece 1 rests upon base 2 in the manner illustrated in FIG. 1. The housing of base 2 includes two inclined ramps 11 and 12 extending between a pair of generally triangular side walls 13. Ramp 11 is shorter and steeper than ramp 12. The side walls 13 and the end wall 14 extend above the ramp 12 to form a retaining cradle for handpiece 1. Side walls 13 extend beyond ramp 11 and are joined at their ends by an end wall 15. End wall 15 is interrupted by a gap 16 through which a tubular anchoring fitting for cable 3 may pass when handpiece 1 rests on base 2 and during the pivotal movement of handpiece 1. A void space 17 is formed between ramp 11, side walls 13 and end wall 15. A switch operating member 18 protrudes through a transverse slot towards the top end of ramp 11.

Handpiece 1 has an elongated housing including a shorter section 21 angularly disposed to the longer section 22. Section 21 incorporates a mouthpiece 23 and houses a microphone (not shown). An earpiece 24 is formed towards the free end of section 22, which houses appropriate receiving means (not shown). To facilitate communication to the microphone and from the receiving means, the mouthpiece 23 and the earpiece 24 are provided with apertures in the bottom panels 25 and 26 of the handpiece housing. Dialling means 27, preferably of the push button type, is also included on the bottom panel 26. Appropriate circuitry including connections to the microphone, to the receiving means, and to the dialling means 27 are included within the handpiece housing.

Figure 2:
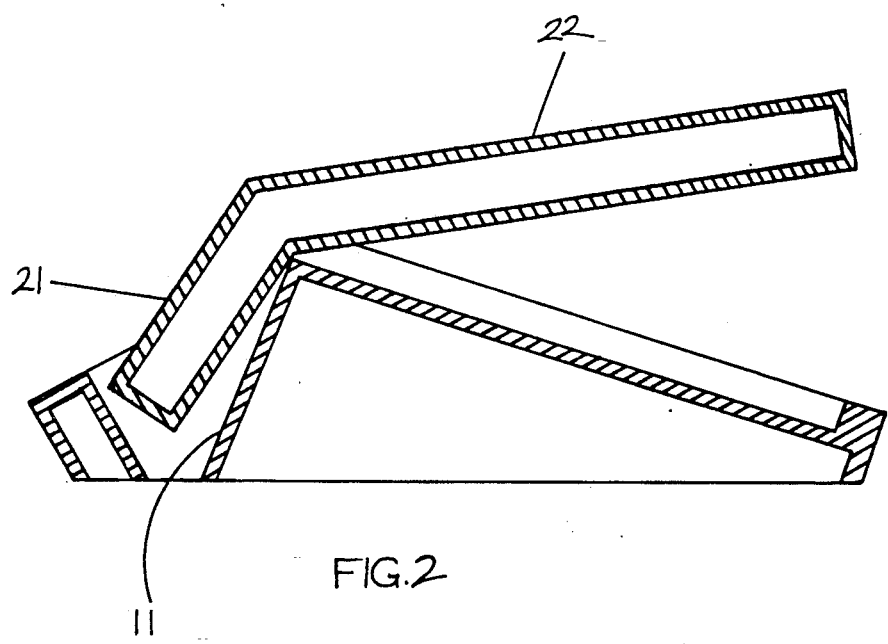
FIG. 2 is a side view of the telephone handset illustrated in FIG. 1 with one end of the handpiece depressed into a void in the base to elevate the other end of the handpiece above its resting position on the base.

For the "on call" situation handpiece 1 rests on base 2 in the manner illustrated in FIG. 1. Bottom housing panel 26 of section 22 abuts against ramp 12 whilst bottom panel 25 of section 21 is angularly spaced from ramp 11. Bottom panel 25 engages switch operating member 18 to hold it within its slot. To facilitate gripping of handpiece 1, section 21 is depressed into void 17, if necessary until bottom panel 25 abuts against ramp 11. Depressing section 21 causes handpiece 1 to pivot about the position where ramps 11 and 12 meet so that section 22 rises to be angularly spaced from ramp 12 as illustrated in FIG. 2. In this position, section 22 is easily gripped and handpieced 1 may be removed from base 2, releasing switch operating member 18 which moves out of its slot in the usual way.

A novelty telephone handset may be formed using the construction described. Section 22 and ramp 12 may be shaped and/or ornamented to represent the jaws of a crocodile. The upper panel of section 22 may be moulded to represent the face of a crocodile. In its "on call" position, the jaws of the crocodile are closed but they open simply by depressing section 21 into void 17. Although the telephone set has been described as one suitable for sitting on a substantially horizontal surface, the construction is capable of modification to make the handset suitable for mounting on a wall. Other modifications are within the scope of this invention. For example, the dialling means may be formed on the base.

What is claimed is:

1. A telephone means comprising:

a handset having an elongated housing including a mouthpiece section and an earpiece section, the earpiece and the mouthpiece sections being angularly disposed relative to each other with the earpiece section being longer in length than the mouthpiece section; a base means for supporting the telephone handset, the base means having a ramp means, a void and a fulcrum which separates the void and the ramp means; wherein the ramp means is shaped to correspond to the earpiece section such that when the handset is mounted on the base, the longer earpiece section is supported and the mouthpiece section is mounted over the void; and wherein the user can easily detach the handset from the base by pressing down on the mouthpiece portion which (a) causes the mouthpiece section to extend downwardly into the void and (b) causes the earpiece section to extend upwardly, whereby the earpiece portion can then be easily gripped by the user.

2. The telephone means as in claim 1 wherein the pressing down action occurs by applying hand pressure to the back of the telephone.

* * * * *